Aug. 1, 1939.  J. C. KARNES  2,167,657
PERISCOPE
Filed May 18, 1938
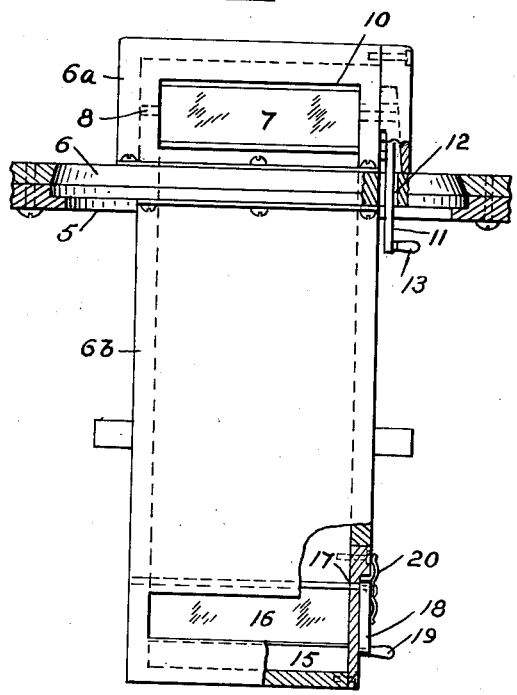
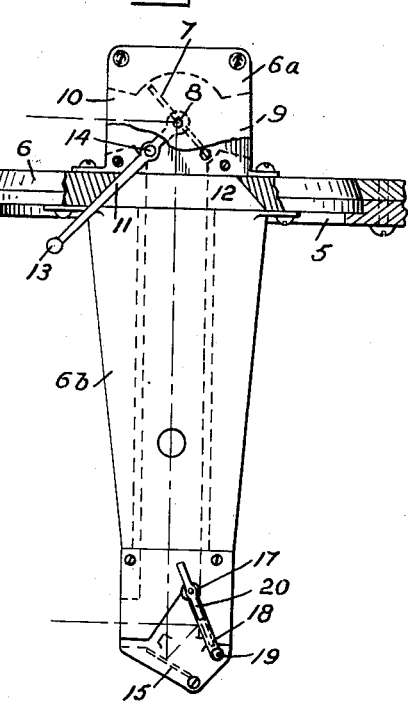
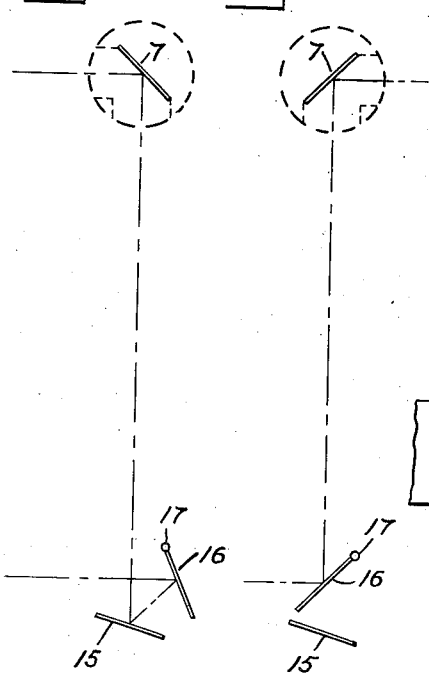
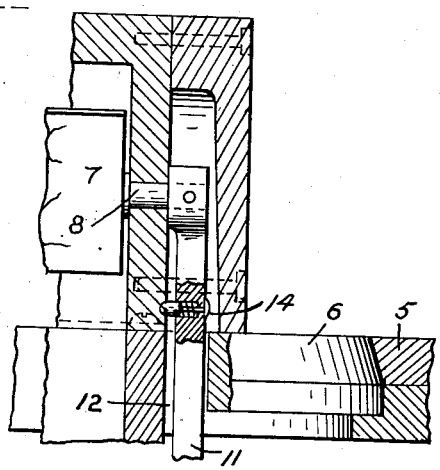
Inventor
James C. Karnes
By G. J. Kessenich
Attorney Patented Aug. 1, 1939

2,167,657

UNITED STATES PATENT OFFICE 2,167,657

PERISCOPE

James C. Karnes, Buffalo, N. Y.

Application May 18, 1938, Serial No. 208,564

1 Claim. (Cl. 88—68)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a periscope.

The purpose of this invention is to provide a periscope in which the optical elements may be easily and quickly adjusted to enable an observer to reverse the direction of the field of view.

To these and other ends, the invention consists in the construction, arrangement and combination of elements described hereinafter and pointed out in the claim forming a part of this specification.

A practical embodiment of the invention is illustrated in the accompanying drawing, wherein:

Fig. 1 is a view in rear elevation of the improved periscope;

Fig. 2 is a view in side elevation;

Figs. 3 and 4 are diagrammatic views showing the different positions of adjustment of the optical elements;

Fig. 5 is an enlarged sectional view through one side of the upper portion of the casing.

Referring to the drawing by characters of reference there is shown a support 5 which may be the roof of a structure in whose interior an observer is stationed. A casing 6 rotatably mounted on the support has an upper portion 6a disposed on the outside of the support and an inner portion 6b disposed within the support.

A mirror 7 having reflecting surfaces on its opposite sides is mounted in the upper portion 6a by means of trunnions 8 and is arranged to be moved across a pair of sight openings 9 and 10 which are formed in the portion 6a and which for convenience will be referred to respectively as front and rear sight openings, reference being had to the observer. A lever 11 associated with one of the trunnions and serving to move the mirror, extends through a slot 12 in the casing and has a handle 13 disposed within the structure. The lever is disposed perpendicularly to the mirror so that when it is in the position shown in Fig. 2 the mirror will reflect rays entering the rear opening 10. Movement of the lever through ninety degrees positions the mirror to receive rays entering the front opening 9. A latch 14 carried by the lever and engageable with the casing holds the lever in its positions of adjustment.

In the lower end of the inner portion 6b of the casing there is a fixed mirror 15 mounted in an inclined position. A mirror 16 also in the lower end of the casing is provided at its upper corners with trunnions 17 which are mounted in the casing above the front edge of the fixed mirror 15. A lever 18 associated with one of the trunnions and parallel with the mirror has a handle 19 on its lower end and is provided with a latch 20 whereby it is held in two positions of adjustment.

In the position of adjustment shown in Figs. 2 and 3 the mirror 16 receives reflections from the mirror 15 which serves to erect the image. In this position, which is for rearward observation, the mirror 7 is presented to the rear sight opening 10. In the position of adjustment shown in Fig. 4, which is for forward observation, the mirror 16 blocks off the mirror 15 and directly receives reflections from the mirror 7 which is presented to the front sight opening 9.

I claim:

In a periscope, a casing, means for mounting the casing intermediate its ends for axial rotation, a first mirror in one end of the casing having reflecting surfaces on its opposite sides and pivotally mounted for selective movement into two positions of adjustment to receive images from opposite directions and reflect them in the same direction, a second mirror fixed in the other end of the casing and arranged to receive reflections from the first mirror in one of its positions of adjustment, and a third mirror pivotally mounted in the casing adjacent the second mirror for selective movement into two positions of adjustment, one of the positions being in parallelism with the first mirror in one of the positions of adjustment of said first mirror to directly receive reflections from said first mirror and block off the second mirror, and the other position of adjustment of said third mirror arranged for receiving reflections from the second mirror.

JAMES C. KARNES.